United States Patent [19]

Hermann

[11] Patent Number: 4,919,721

[45] Date of Patent: Apr. 24, 1990

[54] AIR-DRYING STAINS AND FINISHING COATS FOR WOOD FOR EXTERIOR AND INTERIOR FINISHES

[75] Inventor: Siegbert Hermann, Everswinkel, Fed. Rep. of Germany

[73] Assignee: Ostermann & Scheiwe GmbH & Co. KG, Muenster, Fed. Rep. of Germany

[21] Appl. No.: 196,033

[22] Filed: May 19, 1988

[30] Foreign Application Priority Data

May 21, 1987 [DE] Fed. Rep. of Germany ....... 3717099

[51] Int. Cl.$^5$ .......................... C09K 3/00; C08L 91/00
[52] U.S. Cl. ...................................... 106/34; 106/227; 106/228; 106/241; 106/251
[58] Field of Search .................... 106/244, 250, 228, 2, 106/241, 227, 251, 34

[56] References Cited

U.S. PATENT DOCUMENTS

| | | | |
|---|---|---|---|
| 2,194,295 | 3/1940 | Clarke | 106/227 |
| 2,674,538 | 4/1954 | Berglund | 106/34 |
| 2,717,214 | 9/1955 | Marotta et al. | 106/228 |
| 2,820,711 | 1/1958 | Kiebler et al. | 106/34 |

OTHER PUBLICATIONS

"The Technology of Wood Stains & Fillers for Use with Lacquers", Silverstein, Mech. Eng., vol. 48, Nov. 1926, pp. 1293-1296.

Primary Examiner—Theodore Morris
Attorney, Agent, or Firm—Felfe & Lynch

[57] ABSTRACT

The invention relates to air-drying and finishing coats for wood for exterior and interior finishes, comprising the so-called nonvolatile matter, which represents an intimate mixture of modified natural oils, pigments, extenders and small proportions of varnish additives, and a low-boiling petroleum hydrocarbon, which is suitable as a solvent and is present in an amount of $\leq 15\%$ by weight, based on the total amount.

An air-drying stain for exterior finishes is to be provided, with which a spotty or mottled appearance of the dried surface is avoided reliably even after a single coat of paint.

This objective is accomplished by a stain, the mixture of chemically modified natural oils of which have a consistency, so that the efflux time from a DIN 53,211 4 mm viscosity cup is between 28 and 35 seconds, and the extender of which comprises a fine, cryptocrystalline, amorphous silicon dioxide, in which the proportion of particles with a particle size less than 40 $\mu$m is greater than 95%.

2 Claims, No Drawings

AIR-DRYING STAINS AND FINISHING COATS FOR WOOD FOR EXTERIOR AND INTERIOR FINISHES

FIELD OF THE INVENTION

The invention relates to air-drying stains and finishing coats for wood for exterior and interior finishes, comprising the so-called nonvolatile matter, which represents an intimate mixture of modified natural oils, pigments, extenders and small proportions of varnish additives, and a low-boiling petroleum hydrocarbon, which is suitable as a solvent and is present in an amount of $\leq 15\%$ by weight, based on the total amount.

BACKGROUND INFORMATION AND PRIOR ART

There is a desire to produce air-drying stains with a high content of nonvolatile matter and a low content of volatile solvents. These stains and finishing coats for wood are to be processed (painted, brushed) by laymen as well as by experts. Chemically modified natural oils are used to produce such stains with high contents of nonvolatile mater. On the other hand, there are also other stains, which are mixed solely on the basis of water. The stains based on natural oils penetrate deeply into a wood substrate. The finish does not swell the wood, which is protected against embrittlement and drying out. Since only one coat needs to be applied, application possibilities arise for saving time and materials.

However, when applying known air-drying stains, it has turned out in isolated cases that the painted wood surface, when dry, develops a "spotty" or mottled appearance. This appearance, which reduces the value of the surface, arises because of incomplete penetration of the stain with its nonvolatile matter into the wood. It is as if islands of high concentrations of solids remain behind at the surface and cause the finish to appear to be inhomogeneous.

SUMMARY OF THE INVENTION

It is therefore an object of the invention to provide an air-drying stain for exterior finishes, which avoids a spotty or mottled appearance, even if only a single coat is applied, while nevertheless retaining also the remaining properties, especially the low solvents content.

Pursuant to the invention, this objective is accomplished for a stain of the initially mentioned type owing to the fact that the mixture of chemically modified natural oils has a consistency, so that its efflux time from a DIN 53,211 4 mm (or its equivalent No. 4 Ford Cup - ASTM 1200-58) viscosity cup is between 28 and 35 seconds, and that the extender comprises a fine, cryptocrystalline, amorphous silicon dioxide, in which the percentage of particles with a particle size $\leq 40$ $\mu$m is more than 95%. Preferably the particle size of 99% of the extender should be between 2 and 20 $\mu$m.

Modified natural oils or natural oil mixtures, which have a relatively low viscosity, can be prepared by appropriate chemical modifications, such as those known to the varnish expert. This viscosity then results in a viscosity which, according to the aforementioned DIN 53-211(ASTM 1200-58) measurement procedure, corresponds to an efflux time of between 28 and 35 seconds from the standardized, 4 mm viscosity cup. By means of the measurement according to the DIN 53,211 procedure with a 4 mm viscosity cup, (or the equivalent No. 4 Ford Cup - ASTM 1200-58) a sum of viscosity properties, which are of importance to the varnish expert, is determined. This is not a "scientific" measurement, because velocity gradients and shear stresses cannot be taken into consideration. Known wood stains, based on alkyd resins, for example, have an efflux time of 14 seconds at 20° C. (see Brasholz, "Handbuch der Anstrich- und Beschichtungstechnik" (Handbook of Painting and Coating Techniques), Bauverlag GmbH, Wiesbaden and Berlin, 1978; page 209).

During the preparation of modified natural oils and/or natural oil mixtures, different substances are treated physically, for example, by boiling. At the same time, chemical reactions can also take place. Different natural oils, such as linseed oil, soybean oil, dehydrated castor oil, fish oil, tall oil, tung oil and safflower oil, can be used as substances. These various types of natural oils, which differ with respect to their composition as well as with respect to their origin, can be mixed together without problems.

In order to be able to brush these oils and to ensure that stains will also penetrate partially into the wood, a diluent, which may be a mineral turpentine, benzene, terpene hydrocarbon, ester, ketone or alcohol, is additionally added.

Pigments are added to the stain to provide the varnish with a specific shade of color and to lower the sensitivity towards ultraviolet light, so that the yellowing effect is kept as low as possible. Other varnish additives, so-called dryers, are, for example, dispersants, stabilizers, drying accelerators and anti-settling agents. As drying agent, metals such as cobalt, lead, calcium, barium and zinc are used, which are present as the ion together with an octoate.

For the natural oils, substances are used, which can be obtained from vegetable or animal products. These oils are now treated physically in a process lasting many hours, while controlled chemical reactions also take place at the same time. The natural oils are heated and mixed intimately. As chemical reaction, first of all an oxidation of some chemical bonds takes place, so that a hydroxyl group and, next to it, a hydrogen are added in place of the double bond. In a second reaction, hydroxyl groups are esterified with acids or their salts. Since the viscosity of a modified natural oil depends on the number of double bonds and on the number of ester bonds, it is necessary to control the oxidation and esterification. For the bulk of the processing time, oxygen is therefore excluded by carrying out the processing and stirring in an atmosphere of nitrogen.

The compositions of modified natural oils and their processing are based on formulations and directions, which are known to thoss skilled in the art.

It is well-known that inorganic silicon compounds, such as silicas, diatomaceous earth and the like, may be added as extenders. These material have not, however, turned out to be a success as extenders for the above-mentioned purpose. Surprisingly, it has turned out that there are fine, cryptocrystalline, amorphous silicon dioxides from natural deposits, which bring about the desired effect. The silicon dioxides mentioned are those, which are added, for example to the finest abrasives. These materials have abrasive properties. It could not have been anticipated that they would also be suitable especially for the production of air-drying stains and finishing coats for wood, a single application of which results in an adequate, homogeneous paint-coated surface. Typical properties of such silicates are:
appearance: fine, white powder
density: 2.65
refractive index: 1.54–1.55
coefficient of reflection: 88.5–90.5
oil number: 29–31
Mohs hardness: 6.5
proportion of particles less than 40 μ: 99.0–100%

The materials are found as mineral and, if necessary, are comminuted appropriately by a grinding process.

Obviously, the stains and finishing coats for wood, which have the properties of exterior paints, may be used as interior paints, if there are no toxic materials in the paints.

To explain the invention, two examples are given, it being understood that these examples are given by way of illustration and not by way of limitation.

EXAMPLES 1

One hundred parts of black, air-drying stain are to be prepared. For this purpose, a mixture of 1.5 parts of carbon black and 17 parts of the aforementioned cryptocrystalline, amorphous silicon dioxide is milled and mixed with addition of pigment dispersers in a ball mill. The mixture, coming out of the ball mill, is treated with a urethanized mixture of 60% linseed oil and 40% soybean oil, which is adjusted to a consistency corresponding to an efflux time of 30–32 seconds from a 4 mm viscosity cup at 20° C. using the method of DIN 53,211 (or the equivalent No. 4 Ford Cup - ASTM 1200-58). In addition, mineral turpentine is added as solvent, so that a mixture of the following parts results:
pigment/extender: 18.5 parts
oil mixture: 50 parts
low-boiling petroleum hydrocarbon: 15 parts The remainder represents varnish additives (anti-settling agents, drying accelerators, pigment dispersers and the like), the use of which for the production of varnishes is known.

The aforementioned parts are mixed intimately and filled into appropriate packing drums.

EXAMPLE 2

Preparation of 100 parts of a stain in a green shade

A mixture of 2.5 parts of chromium oxide green with 16.5 parts of an extender of a fine cryptocrystalline, amorphous silicon dioxide is intimately mixed in a dissolver with addition of pigment dispersers. In the second phase of the mixing process, there are added 60 parts of a long-oil linseed oil varnish, having a consistency, for which an efflux time from a 4 mm viscosity cup of between 28 and 30 seconds is measured at 20° C. using the method of DIN 53,211 (or the equivalent No. 4 Ford Cup - ASTM 1200-58). the usual varnish additives, similar to those mentioned in Example 1, are added in an amount of 7%. In addition, 14% by weight of a low-boiling petroleum hydrocarbon, as used for varnishes, is admixed. The following composition thus arises:
2.55 chromium oxide green
16.5% silicon dioxide
60% oil mixture
7% lacquer additives
14% solvents.

All of the aforementioned percentages are by weight. The processing temperature for the two examples is 20° C., that is, normal room temperature.

The adjustment of the viscosity of the chemically modified natural oils can be brought about in various ways, which are known to those skilled in the art.

EXAMPLE 3

To prepare a pale-red stain, pigments, varnish additives, as well as anti-settling agents, drying accelerators and cross-linking agents were intimately mixed together with silicon dioxide in a ball mill. Subsequently, this mixture was treated with a modified natural oil (triglycerides and/or phthalic anhydride) together with mineral turpentine. After the individual components were mixed, the stain had a viscosity corresponding to an efflux time of 33 +1 seconds (DIN 53,211, 4 mm) or the equivalent No. 4 Ford Cup -ASTM 1200-58. The processing took place at a temperature of 21° C. The composition was as follows:
varnish additive: 4 parts
silicon dioxide: 26 parts
modified natural oil: 55 parts (triglycerides, anhydrides)
mineral turpentine: 15 parts

EXAMPLE 4

To produce a white stain, varnish additives such as anti-settling agents, dispersants and drying accelerators, as well as pigments were mixed together with silicon dioxide in a ball mill. This mixture, together with modified, dehydrated castor oil, which was esterified in the presence of polyalcohols and anhydrides, was blended with mineral turpentine. The finished product has a viscosity, which was measured to be 34 ±1 seconds. The processing temperature for the whole of the period was 19° C. The exact composition was as follows:
varnish additives: 5 parts
pigment: titanium dioxide ($TiO_2$) 20 parts
silicon dioxide: 15 parts
dehydrated castor oil, esterified in the presence of polyalcohol and anhydride: 45 parts
mineral turpentine: 15 parts

EXAMPLE 5

To prepare a finishing coat for wood that would cover yellow, pigment and varnish additives were blended together with silicon dioxide in a dissolver until complete homogeneity of the mixture was achieved. Subsequently, modified soybean oil, which had been esterified together with polyalcohols and diisocyanates, was added in the presence of mineral turpentine to this mixture. The viscosity, according to DIN 53,211, 4 mm, (or the equivalent No. 4 Ford Cup - ASTM 1200-58) was 33 ±1 second. The processing took place at 20° C. The finishing coat for wood was to give the outward appearance of an oil varnish after two brushing processes. After two coats, the finish produced had such a thickness, that it gave the appearance of an oil varnish. The other properties, such as weathering resistance, adhesion and cover were also entirely comparable with those of a conventional, commercial oil varnish. The more precise details are as follows:
varnish additives: 2 parts
pigments: iron oxide yellow 5 parts
titanium dioxide 15 parts
silicon dioxide: 15 parts modified natural oil: (soybean oil, esterified in the presence of polyalcohols and diisocyanates) 49 parts
mineral turpentine: 14 parts

EXAMPLE 6

For the production of a colorless stain, a material to prevent yellowing was added as varnish additive. This varnish additive, and the other usual additives, such as drying accelerators, were mixed together with silicon dioxide in a ball mill. Subsequently, varnish linseed oil, polyalcohol and diisocyanate were added in the presence of benzene to this mixture. The varnish linseed oil was acid-free. A viscosity of 29 ±1 seconds (DIN 53,211, 4 mm or the equivalent No. 4 Ford Cup ASTM 1200-58) was achieved.

varnish additives: 5 parts
silicon dioxide: 15 parts
varnish linseed oil: 65 parts
benzene: 15 parts

EXAMPLE 7

A white finishing coat for wood was prepared. Two coats of this material were to give the outward appearance of an oil varnish. For this purpose, varnish additives, pigments and silicon dioxide were treated as before in a ball mill and subsequently mixed with tung oil and varnish linseed oil in the presence of mineral turpentine. During this procedure, the processing temperature was 22° C. The viscosity achieved corresponded to an efflux time of 34 ±1 seconds (DIN 53,221, 4mm or the equivalent No. 4 Ford Cup - ASTM 1200-58). After the application of two coats, the finishing coat for wood, so prepared, has such a thickness, that it gave the appearance of an oil varnish. The other properties, such as weathering resistance, adhesion and cover were entirely comparable with those of a conventional, commercial oil varnish. The more precise values were:

varnish additives: 3 parts
pigments: titanium dioxide $TiO_2$ 25 parts
silicon dioxide: 15 parts
natural oil:
tung oil: 7 parts
varnish linseed oil: 35 parts
low-boiling petroleum hydrocarbon: 15 parts

EXAMPLE 8

To prepare a colorless stain, modified linseed oil (polyalcohol and diisocyanate) were blended together with previously mixed varnish additives and silicon dioxide in the presence of mineral turpentine. The viscosity, so achieved, corresponded to an efflux time of 28 ±1 second. The more exact values are as follows:

varnish additives: 3 parts
silicon dioxide: 22 parts
modified lined oil: (polyalcohol and diisocyanate) 65 parts
mineral turpentine: 10 parts

EXAMPLE 9

A light green stain was prepared. For this purpose, varnish additives were provided with the appropriate pigments and blended together with silicon dioxide in a dissolver. Specific, esterified vegetable fatty acids, dissolved in mineral turpentine, were added to this. The viscosity, expressed as the efflux time, was 32 ±1 second. The exact listing was as follows:

varnish additives: 8 parts
pigments:
chromium oxide: 4 parts
titanium dioxide: 3 parts
silicon dioxide: 15 parts
fatty acids (esterified): 57 parts
mineral turpentine: 13 parts

EXAMPLE 10

A dark-brown stain was prepared by blending a mixture of varnish additives, pigment and silicon dioxide together with a modified fish oil in the presence of mineral turpentine. The viscosity, so achieved, corresponded to an efflux time of 34 ±1 second. The mixing was carried out at a temperature of 18°. The exact listing is as follows:

varnish additives: 4 parts
pigment: iron oxide brown 8 parts
silicon dioxide: 22 parts
modified fish oil: 55 parts
mineral turpentine: 11 parts Those skilled in the art are familiar with producing natural oil, which are modified in this manner on the basis of formulations that have already existed for a lone time. Because it has little ecological impact and produces relatively little discomfort in the persons, who subsequently apply the stains or finishing coats, mineral turpentine is the preferred solvent. However, as was previously recounted, other solvents are also conceivable. To achieve the appropriate viscosity of the end product, that is the stains or the finishing coats for wood, it is essential for the production that the rather tight tolerances for the individual process parameters be strictly observed.

I claim:

1. A non-aqueous composition for an air-dryable stain and finishing coat for wood for exterior and interior finishes, which comprises a nonvolatile mixture of chemically modified natural oils, together with pigments, extenders and varnish additives, and further comprising a
   volatile low-boiling petroleum hydrocarbon, which is suitable as a solvent and is present in an amount of less than or equal to 15% by weight, based on the total amount, and
   a mixture of chemically modified natural oils having a consistency whereby the efflux time from a DIN 53 211 4 mm viscosity cup or the equivalent No. 4 Ford Cup-ASTM 1200-58 of said chemically modified natural oils is between 28 and 35 seconds and is present in an amount of from 35-65% by weight, and
   wherein the extender comprises a fine, cryptocrystalline, amorphous silicon dioxide wherein more than 95% of the silicon dioxide particles have a particle size of less than 40 micrometer, and is present in an amount of from 15-30 per cent by weight, and
   wherein the composition results in a smooth one-coat stain and finish.

2. The non-aqueous air dryable stain and finishing coat of claim 1, wherein 99% of the silicon dioxide extender has a particle side between 2 and 20 micrometers.

* * * * *

UNITED STATES PATENT AND TRADEMARK OFFICE
CERTIFICATE OF CORRECTION

PATENT NO. : 4,919,721

DATED : April 24, 1990

INVENTOR(S) : Siegbert Hermann

It is certified that error appears in the above-identified patent and that said Letters Patent is hereby corrected as shown below:

Col. 3, line 64, change "2.55" to -- 2.5% --.

Signed and Sealed this

Thirty-first Day of December, 1991

Attest:

HARRY F. MANBECK, JR.

Attesting Officer      Commissioner of Patents and Trademarks